(12) United States Patent
Okada

(10) Patent No.: US 9,057,431 B2
(45) Date of Patent: Jun. 16, 2015

(54) DIFFERENTIAL APPARATUS

(75) Inventor: Susumu Okada, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 145 days.

(21) Appl. No.: 13/576,167

(22) PCT Filed: Dec. 14, 2010

(86) PCT No.: PCT/JP2010/007246
§ 371 (c)(1),
(2), (4) Date: Jul. 31, 2012

(87) PCT Pub. No.: WO2011/099107
PCT Pub. Date: Aug. 18, 2011

(65) Prior Publication Data
US 2012/0295751 A1 Nov. 22, 2012

(30) Foreign Application Priority Data
Feb. 15, 2010 (JP) .................................. 2010-030214

(51) Int. Cl.
*F16H 57/04* (2010.01)

(52) U.S. Cl.
CPC ........ *F16H 57/0483* (2013.01); *F16H 57/0424* (2013.01); *F16H 57/0457* (2013.01); *F16H 57/0471* (2013.01)

(58) Field of Classification Search
CPC ............ F16H 57/0483; F16H 57/0424; F16H 57/0457
USPC ........ 475/160, 159, 230, 248; 184/6.12, 11.1, 184/11.2, 13.1
See application file for complete search history.

(56) References Cited

U.S. PATENT DOCUMENTS

| | | | |
|---|---|---|---|
| 1,775,623 A * | 9/1930 | Morgan ........................ | 184/13.1 |
| 3,153,464 A * | 10/1964 | Nelson et al. ................ | 184/11.2 |
| 7,789,786 B2 | 9/2010 | Fujita et al. | |
| 8,109,174 B2 * | 2/2012 | Hilker et al. ................ | 74/606 A |
| 2007/0191168 A1* | 8/2007 | Corless et al. ................ | 475/160 |

FOREIGN PATENT DOCUMENTS

| | | |
|---|---|---|
| JP | 3-130463 U | 12/1991 |
| JP | 4 302758 | 10/1992 |
| JP | 2002 147583 | 5/2002 |
| JP | 2008 202612 | 9/2008 |

OTHER PUBLICATIONS

International Search Report Issued Mar. 25, 2011 in PCT/JP10/07246 Filed Dec. 14, 2010.
Office Action issued Mar. 12, 2013 in Japanese Patent Application No. 2010-030214 (partial English-language translation only).

* cited by examiner

*Primary Examiner* — Gene Crawford
*Assistant Examiner* — Terry Chau
(74) *Attorney, Agent, or Firm* — Oblon, McClelland, Maier & Neustadt, L.L.P.

(57) ABSTRACT

Differential apparatus capable of guiding and supplying a sufficient amount of lubricant oil to the lubrication elements accommodated in the differential apparatus (6). The differential apparatus comprises a differential case (11), a differential carrier (21), a carrier cover (22), a differential mechanism housed in the differential case, and a ring gear (14) secured to the ring differential case. The differential case has a through bore (35,36,42) radially formed in differential case to have the inner space of the differential case held in communication with the outer space of the differential case. The differential carrier has a lubricant oil reservoir portion (28) positioned below the differential case to reserve the lubricant oil therein. The carrier cover is secured to the differential carrier and has a lubricant oil flow guide portion (64) vertically extending in the vicinity of and in side-by-side relationship with the outer circumferential portion of the ring gear to guide the lubricant oil of the lubricant oil reservoir portion stirred up with the rotation of the ring gear and to discharge the lubricant oil toward the central portion of the differential mechanism.

3 Claims, 14 Drawing Sheets

DIFFERENTIAL APPARATUS

TECHNICAL FIELD

The present invention relates to a differential apparatus, and more particularly to a differential apparatus which can lubricate lubrication elements with a sufficient amount of lubricant oil stirred up by a ring gear to be rotated.

BACKGROUND ART

There have so far been proposed various types of differential apparatuses one of which comprises a differential case for accommodating a differential mechanism therein, a differential carrier for rotatably supporting the differential case, a carrier cover attached to the differential carrier, a ring gear secured to the differential case, a drive pinion held in mesh with the ring gear, and a pair of bearings for rotatably supporting shaft portions of the drive pinion (See, for example, Patent Document 1).

The above mentioned differential apparatus is constructed in such a manner that the bearings to rotatably support the drive pinion are positioned in a pinion shaft chamber formed in the differential carrier. In addition, the differential carrier is formed with a lubricant oil introduction chamber for receiving lubricant oil stirred up by the ring gear. The lubricant oil introduction chamber is positioned in the pinion shaft chamber to be offset with respect to the ring gear. The bottom portion of the lubricant oil introduction chamber extends downwardly from the top part of the pinion shaft chamber, while the bottom portion of the lubricant oil introduction chamber has a lubricant oil hole formed therein, the lubricant oil hole extending from the lubricant oil introduction chamber to the pinion shaft chamber to be slanted with respect to the horizontal plane allowing the center axis of the drive pinion to pass thereon. Here, the inner side surface of the lubricant oil introduction chamber is inclined with respect to the horizontal plane so that the lubricant oil introduced in the introduction chamber gathers toward the lubricant oil hole.

The above mentioned construction of the conventional differential apparatus enables the lubricant oil in the differential carrier to be stirred up by the ring gear and then introduced into the lubricant oil introduction chamber with a centrifugal force caused by the lubricant oil. The lubricant oil introduced into the lubricant oil introduction chamber flows downwardly along the slanted inner side surface of the lubricant oil introduction chamber with a gravity force of the lubricant oil, before reaching the lubricant oil hole formed on the bottom portion of the lubricant oil introduction chamber. The lubricant oil is then introduced along the inner side surface of the lubricant oil introduction chamber, passes through the lubricant oil hole, and flows into the pinion shaft chamber from the lubricant oil hole. This results in the fact that some extent amount of lubricant oil is supplied to the pinion shaft chamber so that the bearings for supporting the pinion shaft therefore come to be lubricated.

CITATION LIST

Patent Literature

{PTL 1} Japanese Patent Laying-Open Publication No. 2002-147583

SUMMARY OF INVENTION

Technical Problem

The conventional differential apparatus, however, encounters such a problem that the lubricant oil is not sufficiently supplied to elements constituting the differential mechanism, even though the lubricant oil is stirred up by the ring gear, flown into the pinion shaft chamber from the lubricant oil introduction chamber through the lubricant oil hole to lubricate the bearings for supporting the pinion shaft. This is due to the fact that the conventional differential apparatus is constructed without considering the lubrication to the other elements or parts forming part of the differential mechanism than the bearings for supporting the pinion shaft. This means that the other elements or parts forming part of the differential mechanism than the bearings cannot be sufficiently lubricated.

Another conventional differential apparatus proposed heretofore comprises a differential case, and a differential mechanism accommodated in the differential case. The differential case has a ring gear securely mounted thereon to be held in mesh with a drive pinion. The differential mechanism comprises a pinion shaft secured to the differential case, a pair of differential pinions rotatably supported by the pinion shaft, and left and right side gears held in mesh with the differential pinions. The left side gear is connected to a left drive shaft, while the right side gear is connected to a right drive shaft. This construction makes it possible for the differential apparatus to allow the left rear wheel and the right rear wheel to rotate at different rotation speeds from each other.

The above mentioned construction of the differential apparatus, however, leads to the fact that the lubricant oil stirred up by the ring gear is partly blocked, thereby making it possible for only a relatively small amount of lubricant oil to be supplied to the differential mechanism. This means that a sufficient amount of lubricant oil is difficult to be supplied to the differential mechanism.

More specifically, the amount of lubricant oil supplied to the differential mechanism is reduced resulting from the fact that the lubricant oil is required to pass through a window portion formed in the differential case to the inner side of the differential case. An additional reason for the reduced lubricant oil to the inner side of the differential case is such that the rotation of the differential mechanism together with the differential case generates a centrifugal force which is applied to the lubricant oil to be flown into the inner side of the differential case, thereby hindering the lubricant oil from flowing toward the rotation center of the differential mechanism. Therefore, the lubricant oil stirred up by the ring gear is difficult to be transferred to, and thus only a comparatively small amount of lubricant oil comes to be supplied to the sliding contact portions between the pinion shaft and the differential pinions even though the differential mechanism requires an even more amount of lubrication oil.

As a consequence, the comparatively small amount of lubricant oil supplied to the sliding contact portions may lead to giving rise to the friction heat and seizure of the sliding contact portions. As a consequence, the conventional differential apparatus has such a problem that the characteristics of differential movement allowing the left and right wheels to rotate at different rotation speeds from each other are deteriorated.

Meanwhile, it may be possible to consider utilizing an oil bath to the differential mechanism for soaking a lower portion of the rotating differential case. Therefore, it is required to increase an amount of lubricant oil in the differential carrier. In this case, the increased amount of lubricant oil results in increasing rotational resistance to the rotating elements or parts forming part of the differential apparatus, and thus leading to the increase in friction loss generated on the differential apparatus and thus to gasoline mileage deteriorated. In addition, the lubricant oil may leak from a breather formed with an opening for regulating the internal pressure in response to the increased temperature if the amount of the lubricant oil is increased. Therefore, the conventional differential apparatus encounters another problem that the characteristic for preventing oil leak is deteriorated.

Furthermore, it may be possible to consider lubricating the differential mechanism by dripping the lubrication oil to the differential mechanism. However, the lubricant oil dripping method is performed with the lubricant oil dripping at a low speed, thereby leading to giving rise to an insufficient amount of lubricant oil supplied to the differential mechanism. The lubricant oil dripping method is therefore inadequate for use in lubricating the differential mechanism to be operated at a relatively high speed. It may further be considered that the lubricant oil is forcibly supplied to the inner side of the differential mechanism with a lubricant supplying apparatus such as a lubricant oil pump and the like. In this case, however, an extra equipment like the lubricant oil pump is needed, thereby resulting in manufacturing cost and weight of the automotive vehicle being increased along with the increase in loss of energy to be supplied from an energy source.

It is, therefore, an object of the present invention to provide a differential apparatus which is simple in construction and can reliably guide a lubricant oil stirred up by the rotation of the ring gear, supply the lubricant oil to the lubrication elements or parts accommodated in the differential apparatus, and sufficiently lubricate the lubrication elements or parts.

Solution to Problem

According to one aspect of the present invention to achieve the above object, there is provided (1) a differential apparatus, which comprises a differential case for accommodating therein a differential mechanism having a central portion, a housing for accommodating therein and rotatably supporting the differential case, a ring gear secured to the differential case to be rotatable together with the differential case and having an outer circumferential portion, wherein the differential case having inner and outer spaces and formed with at least one through bore radially extending between the inner and outer spaces to have the inner and outer spaces held in communication with each other, and the housing has a lubricant oil reservoir portion positioned below the differential case to reserve lubricant oil therein, and a lubricant oil flow guide portion extending in the vicinity of and in side-by-side relationship with the outer circumferential portion of the ring gear, the lubricant oil flow guide portion having a lower end portion soaked in the lubricant oil of the lubricant oil reservoir portion and an upper end portion positioned in the vicinity of the central portion of the differential mechanism to guide the lubricant oil stirred up from the lubricant oil reservoir portion with the rotation of the ring gear to ensure that the lubricant oil is discharged toward the central portion of the differential mechanism through the through bore.

By the construction of the differential apparatus previously mentioned, the lubricant oil reserved in the lubricant oil reservoir portion is stirred up with the rotation of the ring gear, and flown into the lubricant oil flow guide portion. The lubricant oil is then guided by the lubricant oil flow guide portion, and supplied toward the central portion of the differential mechanism and the through bore formed in the differential case. The lubricant oil is then supplied to the central portion of the differential mechanism through the through bore formed in the differential case. The remaining volume of the lubricant oil stirred up by the rotation of the ring gear is further stirred up by the rotation of the ring gear, and supplied to the other lubrication elements in the housing.

The lubricant oil reserved in the lubricant oil reservoir portion is therefore supplied to the central portion of the differential mechanism, which results in the fact that the lubrication elements in the differential mechanism is sufficiently lubricated, thereby preventing the seizure of constituent elements of the differential mechanism. In addition, the inner portion of the differential apparatus is sufficiently lubricated due to the fact that the lubricant oil is supplied by the rotation of the ring gear to the other lubrication elements in the housing. Moreover, the lubrication characteristics of the differential apparatus are improved without increasing the size and weight of the differential apparatus with the lubrication oil flow guide portion merely having a simple structure.

In the differential apparatus previously mentioned, (2) the housing is constituted by a differential carrier accommodating therein and rotatably supporting the differential case, and a carrier cover secured to the differential carrier forming together with the differential carrier a housing chamber accommodating therein the differential case and the ring gear, the lubricant oil reservoir portion has a reservoir chamber formed to occupy the lower portion of the housing chamber by the lower portions of the differential carrier and the carrier cover to reserve the lubricant oil therein, the lubricant oil flow guide portion having a flow guide groove formed in the inner wall of the carrier cover to extend in the vicinity of and in side-by-side relationship with the outer circumferential portion of the ring gear and to be open toward the central portion of the differential mechanism, the flow guide groove having a lower end portion soaked in the lubricant oil of the reservoir chamber, and an upper end portion positioned in the vicinity of the central portion of the differential mechanism.

By the construction of the differential apparatus previously mentioned, the lubricant oil in the lubricant oil flow reservoir portion is stirred up by the rotation of the ring gear and directly flown into the lubricant oil flow guide portion due to the fact that the groove of the lubricant oil flow guide portion is held in communicate with the reservoir chamber of the lubricant oil reservoir portion. Therefore, the differential apparatus have an additional advantage that comparatively large amount of lubricant oil can be flown into the lubricant oil flow guide portion.

In the differential apparatus previously mentioned, (3) the lubricant oil flow guide portion has a lubricant oil inlet port positioned in the reservoir chamber to have the lubricant oil introduced therethrough from the lubricant oil reservoir portion, a lubricant oil outlet port open toward the central portion of the differential mechanism to have the lubricant oil discharged toward the central portion of the differential mechanism, and a lubricant oil passageway extending between the lubricant oil inlet port and the lubricant oil outlet port to have the lubricant oil inlet port held in communication with the lubricant oil outlet port.

By the construction of the differential apparatus previously mentioned, the lubricant oil in the lubricant oil reservoir portion of the differential case is stirred up by the rotation of the ring gear, and flown into the lubricant oil flow guide portion through the lubricant oil inlet port. The lubricant oil flown into the lubricant oil passageway is intensively discharged through the lubricant oil outlet port toward the through bore of the differential case. The lubricant oil discharged through the lubricant oil outlet port is supplied to the central portion of the differential mechanism through the through bore of the differential case. The remaining part of the lubricant oil discharged through the lubricant oil outlet port is again stirred up by the rotation of the ring gear and supplied to the other lubrication elements in the housing.

The lubricant oil reserved in the lubricant oil reservoir portion is supplied to the central portion of the differential mechanism and sufficiently lubricate the lubrication elements in the differential mechanism, which results in preventing the seizure of the elements of the differential mechanism. In addition, the inner portion of the differential apparatus is also sufficiently lubricated due to the fact that part of the lubricant oil is supplied to the lubrication elements in the housing by the rotation of the ring gear.

In the differential apparatus previously mentioned, (4) the lubricant oil passageway has a width perpendicular to the flow direction of the lubricant oil flowing from the lubricant oil inlet port to the lubricant oil outlet port, the width being gradually decreased from the lubricant oil inlet port to the lubricant oil outlet port.

By the construction of the differential apparatus previously mentioned, the lubricant oil discharged through the lubricant oil inlet port is accelerated in flow speed while passing through the lubricant oil passageway in the direction in which the width of the lubricant oil passageway is getting narrower, and intensively discharged through the lubricant oil outlet port to the central portion of the differential mechanism. Therefore, the lubricant oil flown into the lubricant oil inlet port is immediately supplied to the central portion of the differential mechanism. This means that the lubricant oil is intensively discharged and supplied to the central portion of the differential mechanism through the through bore of the differential case, and sufficiently lubricates the lubrication elements in the differential mechanism, which results in preventing the seizure of the constituent elements of the differential mechanism.

Advantageous Effects of Invention

The present invention is to provide a differential apparatus which is simple in construction and which can reliably guide lubricant oil stirred up by the rotation of the ring gear so that the lubricant oil can be reliably supplied to the lubrication elements accommodated in the differential apparatus, and sufficiently lubricate the lubrication elements.

DESCRIPTION OF EMBODIMENT

The embodiment of the differential apparatus according to the present invention will be described hereinafter with reference to the drawings.

The construction of the differential apparatus will firstly be explained.

Figure 1:
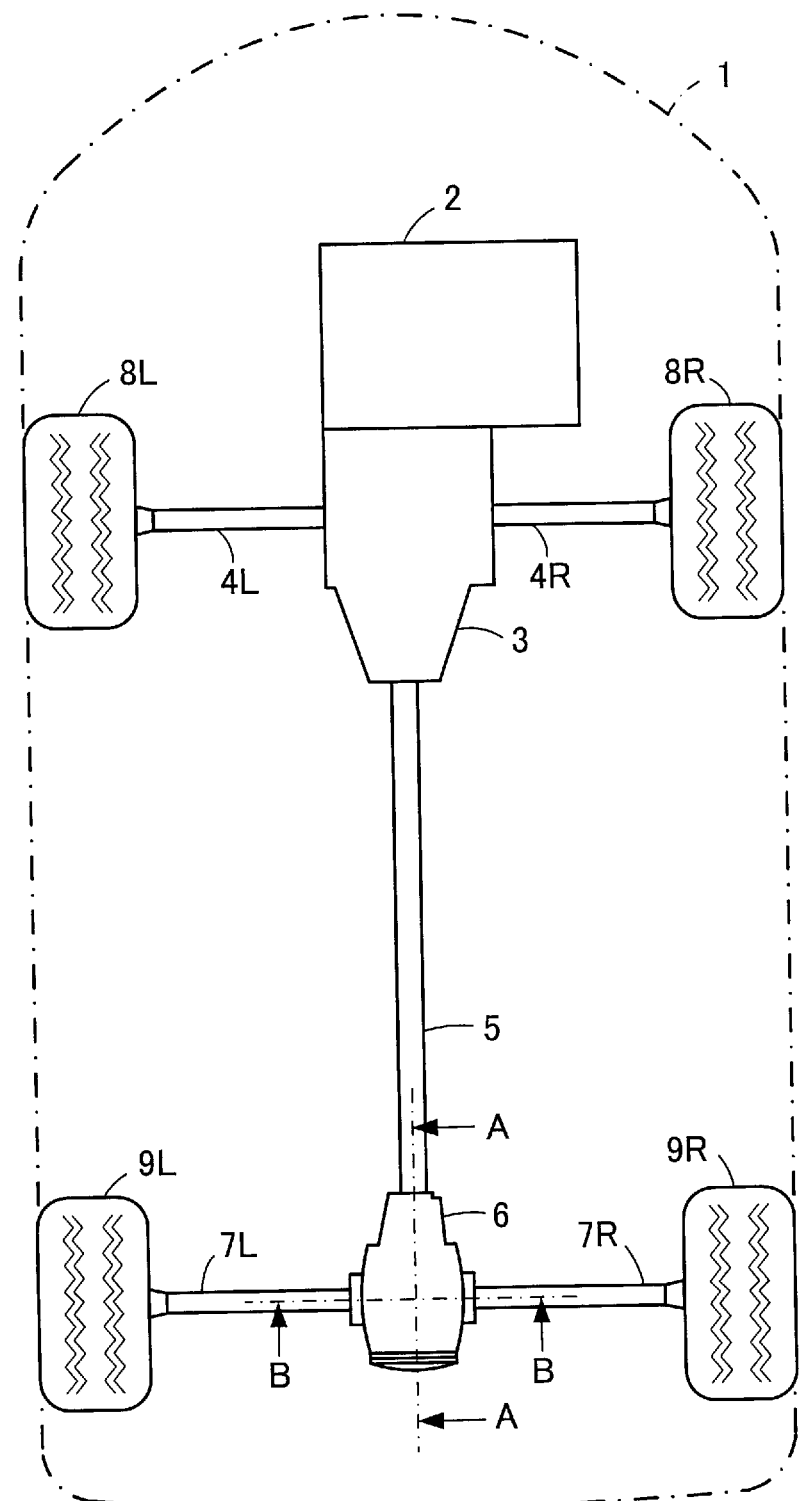
FIG. 1 is a schematic view showing an automotive vehicle having a differential apparatus according to the embodiment of the present invention.

As shown in FIG. 1, the differential apparatus 6 according to the embodiment of the present invention is mounted on the automotive vehicle 1. The automotive vehicle 1 comprises an engine 2, a transmission 3 connected to an output shaft of the engine 2 to have an output power outputted from the output shaft transmitted therethrough, a left front drive shaft 4L, a left front wheel 8L connected to the left front drive shaft 4L, a right front drive shaft 4R, and a right front wheel 8R connected to the right front drive shaft 4R.

The automotive vehicle 1 further comprises a propeller shaft 5 connected to the transmission 3, a differential apparatus 6 connected to the propeller shaft 5, a left rear drive shaft 7L connected to the differential apparatus 6, a left rear wheel 9L connected to the left rear drive shaft 7L, a right rear drive shaft 7R connected to the differential apparatus 6, and a right rear wheel 9R connected to the right rear drive shaft 7R.

Figure 2:
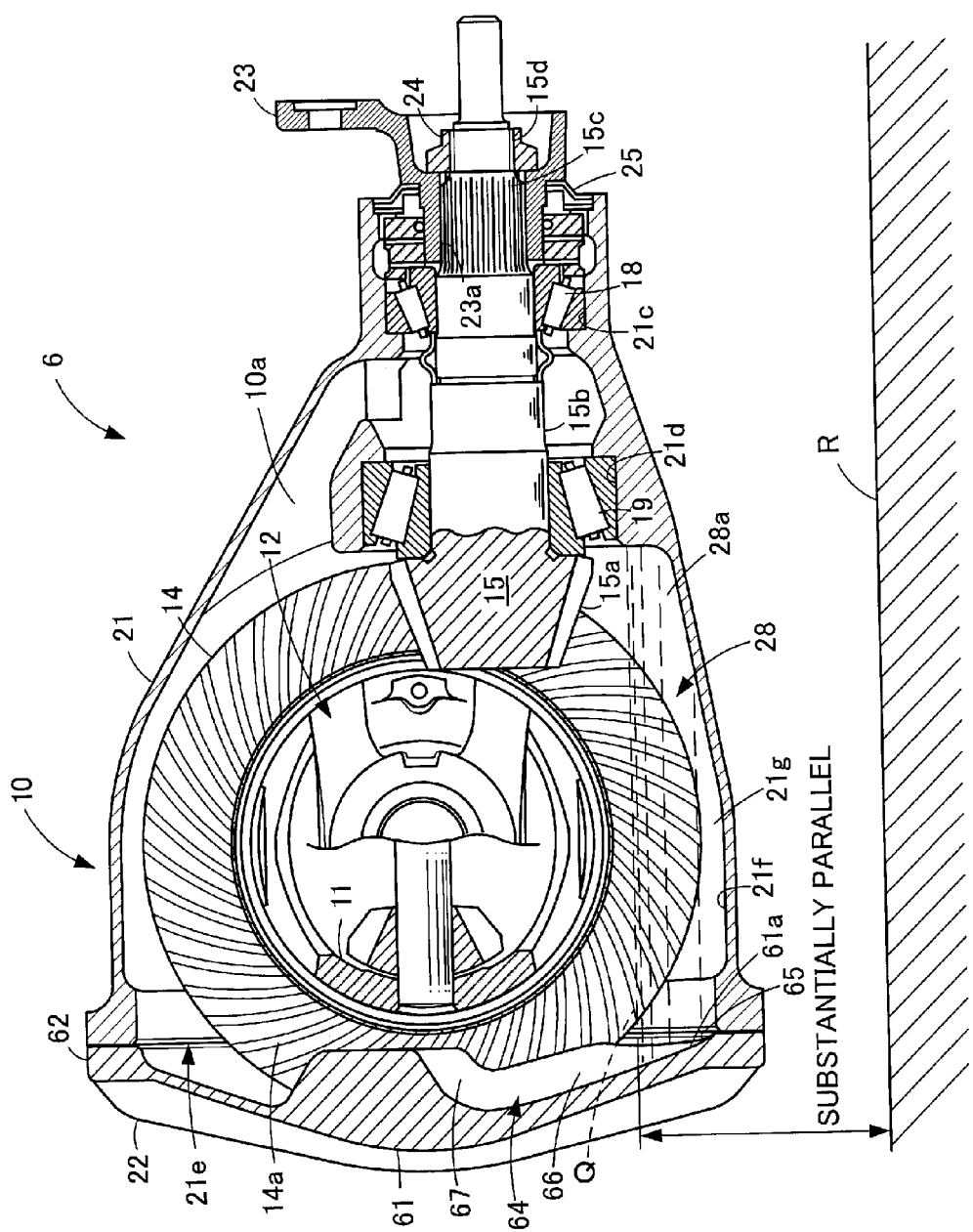
FIG. 2 is an enlarged cross-sectional view taken along the line A-A of FIG. 1.
Figure 3:
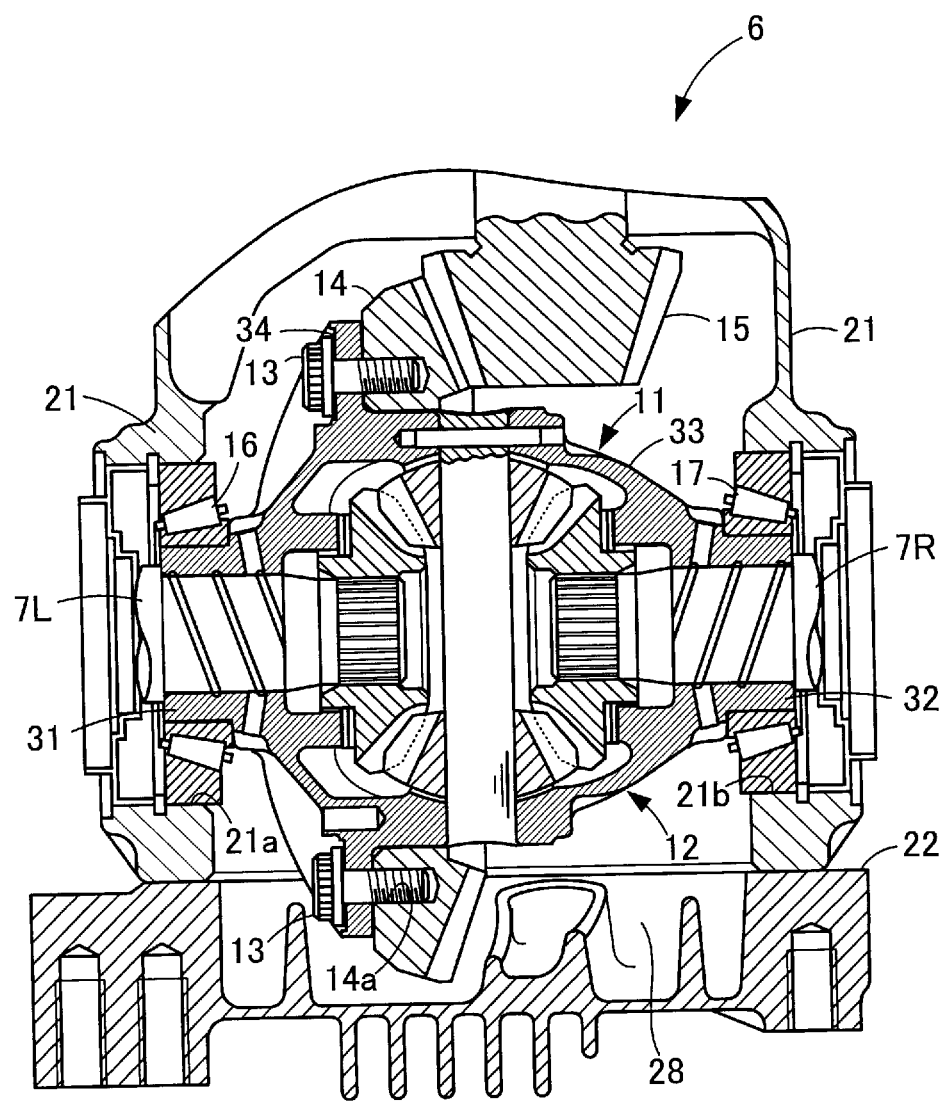
FIG. 3 is a fragmentary cross-sectional view taken along the line B-B of FIG. 1.

As shown in FIGS. 2 and 3, the differential apparatus 6 comprises a differential case 11, a differential mechanism 12 accommodated in the differential case 11, a ring gear 14 positioned to have a center axis horizontally extending and secured to the differential case 11 with a bolt 13 having a washer to be rotatable together with the differential case 11. The ring gear 14 has an outer circumferential portion formed with gear teeth. The differential apparatus 6 further comprises a drive pinion 15 having an outer circumferential portion formed with gear teeth and held in mesh with the ring gear 14 through both of the gear teeth to have the center axis of the drive pinion 15 perpendicular to the center axis of the ring gear 14. The differential apparatus 6 further comprises a differential carrier 21 for accommodating therein and rotatably supporting the differential case 11 through conical roller bearings 16 and 17 while rotatably supporting the drive pinion 15 through conical roller bearings 18 and 19, and a carrier cover 22 vertically extending in the vicinity of and in side-by-side relationship with the outer circumferential portion of the ring gear 14, and secured to the differential carrier 21 with a fastening member now shown in the drawings. The carrier cover 22 forms together with the differential carrier 21a housing chamber 10a accommodating therein the differential case 11, the ring gear 14, and the drive pinion 15.

The differential apparatus 6 further comprises a companion flange 23 connected to the drive pinion 15, a nut 24 for securing the drive pinion 15 to the differential carrier 21, and a sealing member 25 placed between the companion flange 23 and the differential carrier 21 to prevent a lubricant oil from leaking out of the differential apparatus 6.

In the differential apparatus 6 according to this embodiment, the differential carrier 21 serving as a main body and the carrier cover 22 serving as a lid portion for covering the main body collectively constitute a housing 10 of the differential apparatus 6 as defined in the present invention. This means that the housing 10 is constituted by the differential carrier 21 for accommodating therein and rotatably supporting the differential case 11 and the carrier cover 22 secured to the differential carrier 21 forming together with the differential carrier 21a housing chamber 10a as defined in the present invention. The differential carrier 21 and the carrier cover 22 is sealed by the sealing member 25 and other sealing materials not particularly shown in the drawings so that the lubricant oil for lubricating lubrication elements such as the differential mechanism 12, the ring gear 14, the drive pinion 15, and the conical roller bearings 16 to 19 can be prevented from leaking out of the differential apparatus 6.

The housing 10 has a lubricant oil reservoir portion 28 positioned below the differential case 11 to reserve the lubricant oil therein. The lubricant oil reservoir portion 28 has a reservoir chamber 28a formed to occupy the lower portion of the housing chamber 10a by the lower portions of the differential carrier 21 and the carrier cover 22 to reserve the lubricant oil therein. The differential carrier 21 and the carrier cover 22 are formed with a plurality of openings which are respectively closed by sealing members to prevent the lubricant oil from leaking out of the differential apparatus 6 through the opening. The openings and the sealing members are not shown in the drawings.

The differential apparatus 6 is mounted on the automotive vehicle 1 with the rotation center axis of the drive pinion 15 being inclined within about a few degrees with respect to a road surface of a flat road R under the condition that the automotive vehicle 1 stops on the flat road R. In this case, the lower portion of the ring gear 14 is soaked in the lubricant oil reserved in the lubricant oil reservoir portion 28 due to the fact that the lower portion of the ring gear 14 is positioned below the oil surface Q of the lubricant oil when the automotive vehicle stops on the flat road R.

Figure 4:
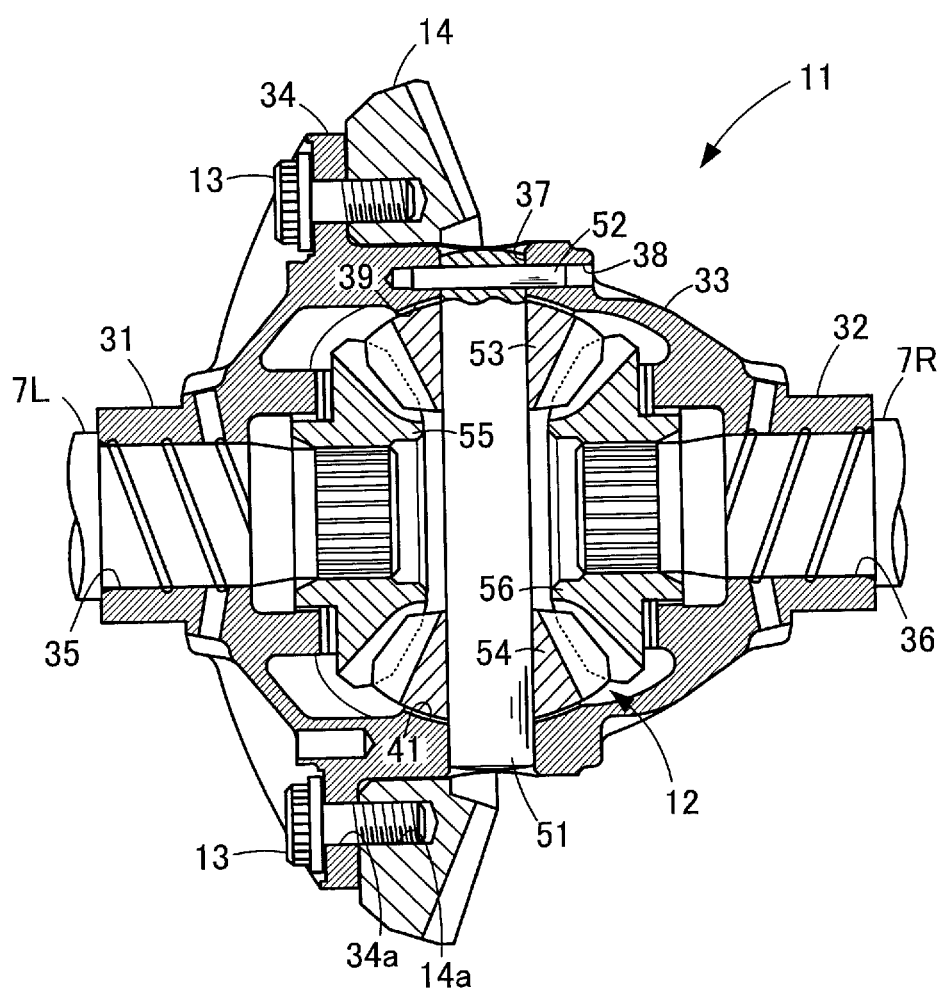
FIG. 4 is a fragmentary cross-sectional view showing a differential case and a differential mechanism according to the embodiment of the present invention.
Figure 5:
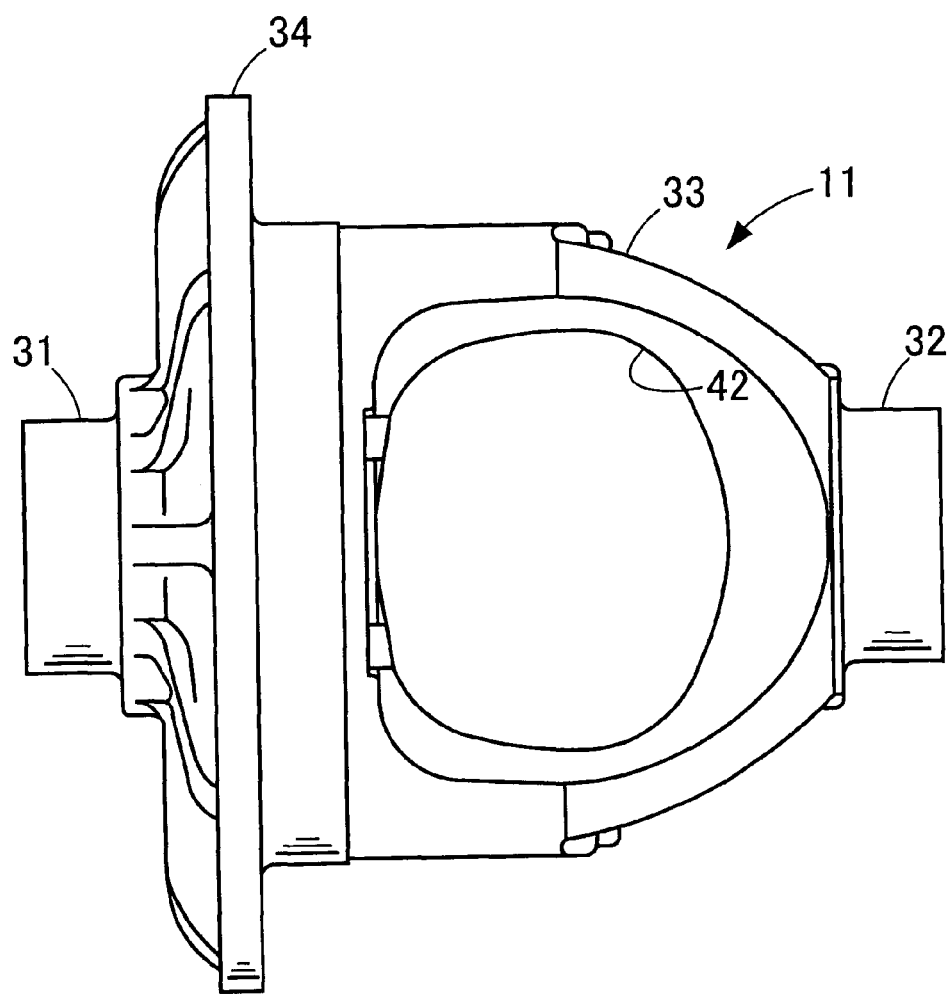
FIG. 5 is a side view showing the differential case of the differential apparatus according to the embodiment of the present invention.

The differential case 11 is made of a metal material having a relatively high stiffness, and has boss portions 31 and 32 axially aligned with each other and extending in an opposite direction with each other, a side wall portion 33 integrally formed with the boss portions 31 and 32, and a flange portion 34 formed to radially outwardly extend from an outer surface of the side wall portion 33 as shown in FIGS. 4 and 5.

The boss portion 31 is formed with a through bore 35 axially extending from the inside of the differential case 11 to the outside of the differential case 11. The boss portion 32 is also formed with a through bore 36 axially extending from the inside of the differential case 11 to the outside of the differential case 11 and thus axially aligned with the through bore 35. The side wall portion 33 is formed with a through bore 37 having a center axis perpendicular to the center axes of the boss portions 31 and 32, and a through bore 38 having a center axis perpendicular to the center axis of the through bore 37. The side wall portion 33 is formed with a support portion 39 having an inner surface in the form of a spherical shape with its center plane perpendicular to the center axis of the differential case 11 and positioned on the center axis of the through bore 37, and a support portion 41 also having an inner surface in the form of a spherical shape positioned at the opposite side of the support portion 39 with respect to the center axis of the differential case 11.

The side wall portion 33 further has a plurality of through bores 42 each in the form of a window and formed therethrough in perpendicular relationship with the through bores 35 and 36 so that the inner and outer surfaces, viz., the interior and the exterior of the differential case 11 are communicated with each other through the through bores 42. This means that the lubricant oil can freely be moved between the inner and outer surfaces of the differential case 11 through the through bores 42. In addition, the through bores 42 can allow the constitution elements or parts forming the differential mechanism 12 to be passed therethrough when the constitution elements or parts are assembled together or disassembled from one another in the differential case 11. According to the present invention, the above through bores 42 may be replaced by only one through bore which allows the inner and outer surfaces, viz., the interior and the exterior of the differential case 11 to be communicated with each other through the through bore 42. The flange portion 34 has a plurality of through bores 34a to respectively receive parts of bolts each with a washer 13 therein to secure the ring gear 14 to the flange portion 34.

The differential mechanism 12 comprises a pinion shaft 51, a fixing pin 52 for securing the pinion shaft 51 to the side wall portion 33 of the differential case 11, a pair of differential pinions 53 and 54 rotatably supported by the pinion shaft 51, and a left side gear 55 and a right side gear 56 both of which are held in mesh with the differential pinions 53 and 54.

The left side gear 55 is splined to the end portion of the left rear drive shaft 7L passing through the through bore 35 of the differential case 11. The right side gear 56 is splined to the end portion of the right rear drive shaft 7R passing through the through bore 36 of the differential case 11. This construction makes it possible for the differential mechanism 12 to allow the left rear wheel 9L and the right rear wheel 9R to rotate at different rotation speeds from each other since the left side gear 55 and the right side gear 56 can be rotated at different speeds by the differential case 11.

The ring gear 14 is constituted by a gear, such as for example, a bevel gear and a hypoid gear having a shaft angle of 90 degrees, and held in mesh with the drive pinion 15 in such a manner that the center axis of the ring gear 14 is perpendicular to the center axis of the drive pinion 15 as shown in FIGS. 3 and 4. Therefore, the power inputted from the drive pinion 15 is transmitted to the differential mechanism 12 through the ring gear 14 at reduced speeds. The flange portion of the ring gear 14 is formed with a plurality of screw holes 14a circumferentially equally spaced apart from each other and having the respective bolts 13 received therein to secure the ring gear 14 to the differential case 11 with washers respectively coupled with the bolts 13.

The drive pinion 15 has a gear portion 15a constituted by a gear such as, for example, a bevel gear and a hypoid gear similar to the ring gear 14, having a shaft angle of 90 degrees. The drive pinion 15 further has a shaft portion 15b integrally formed at one end with the gear portion 15a. The shaft portion 15b is rotatably supported by the differential carrier 21 through the conical roller bearings 18 and 19. The conical roller bearing 19 serves to prevent the drive pinion 15 from moving toward the conical roller bearing 18, viz., in a direction in which the drive pinion 15 is spaced apart from the ring gear 14, so that the ring gear 14 and the gear portion 15a are held in mesh with each other with a predetermined backlash being reserved between the drive pinion 15 and the ring gear 14.

The shaft portion 15b is formed with an external spline 15c engaged with an internal spline 23a formed on the inner peripheral portion of the companion flange 23. The spline engagement of the shaft portion 15b and the companion flange 23 make it possible for the drive pinion 15 to rotate together with the companion flange 23.

The shaft portion 15b is formed with a male screw 15d to have a nut 24 coupled thereto so that the drive pinion 15 is secured to and thus rotated together with the companion flange 23. The companion flange 23 is securely connected to the propeller shaft 5 as shown in FIG. 1. This results in the fact that the power outputted from the engine 2 can be transmitted to the drive pinion 15 through the propeller shaft 5 and the companion flange 23.

The differential carrier 21 shown in FIGS. 2 and 3 is made of a lightweight metal material such as aluminum and shaped with a die-casting method. The differential carrier 21 is formed in thin thickness as a whole and thus has lightweight. Further, the differential carrier 21 has high stiffness by a plurality of ribs reinforcing the differential carrier 21.

The differential carrier 21 has a bearing receiving portion 21a to rotatably receive a conical roller bearing 16 so that the boss portion 31 is rotatably supported by the differential carrier 21 through the conical roller bearing 16. The differential carrier 21 further has a bearing receiving portion 21b to rotatably support a conical roller bearing 17 so that the boss portion 32 is rotatably supported by the differential carrier 21 through the conical roller bearing 17. The differential carrier 21 still further has bearing receiving portions 21c and 21d respectively rotatably receiving conical roller bearings 18 and 19 so that the shaft portion 15 is rotatably supported on the differential carrier 21.

The differential carrier 21 has an opening portion 21e opened at the opposite side to the bearing receiving portions 21c and 21d along the center axis of the differential carrier 21. The opening portion 21e of the differential carrier 21 is covered with the carrier cover 22.

Figure 6:
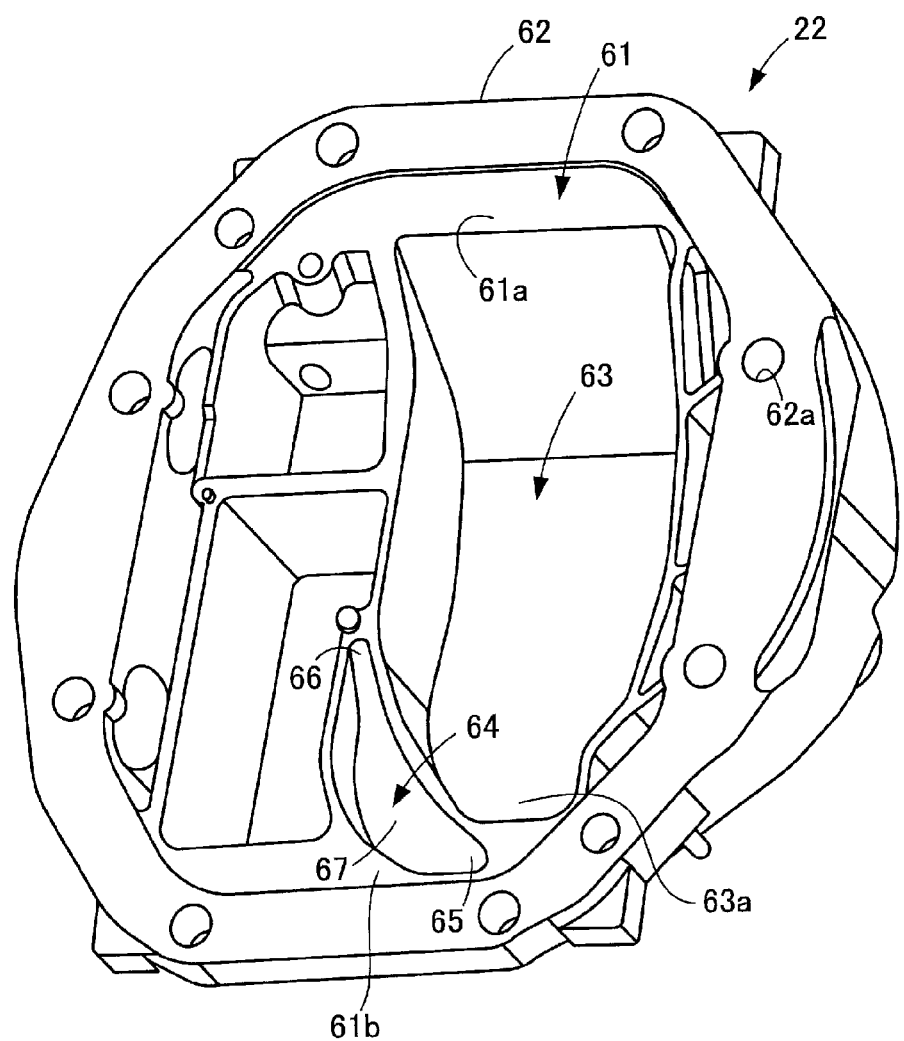
FIG. 6 is a perspective view showing a carrier cover forming part of the differential apparatus according to the embodiment of the present invention.

The carrier cover 22 shown in FIG. 6 is made of a lightweight metal material such as aluminum shaped in a die-casting method in a similar manner to the differential carrier 21. The carrier cover 22 has a thin thickness as a whole and thus has lightweight. Further, the carrier cover 22 has high stiffness by a plurality of ribs extending outwardly to reinforce the differential carrier 21.

Figure 7:
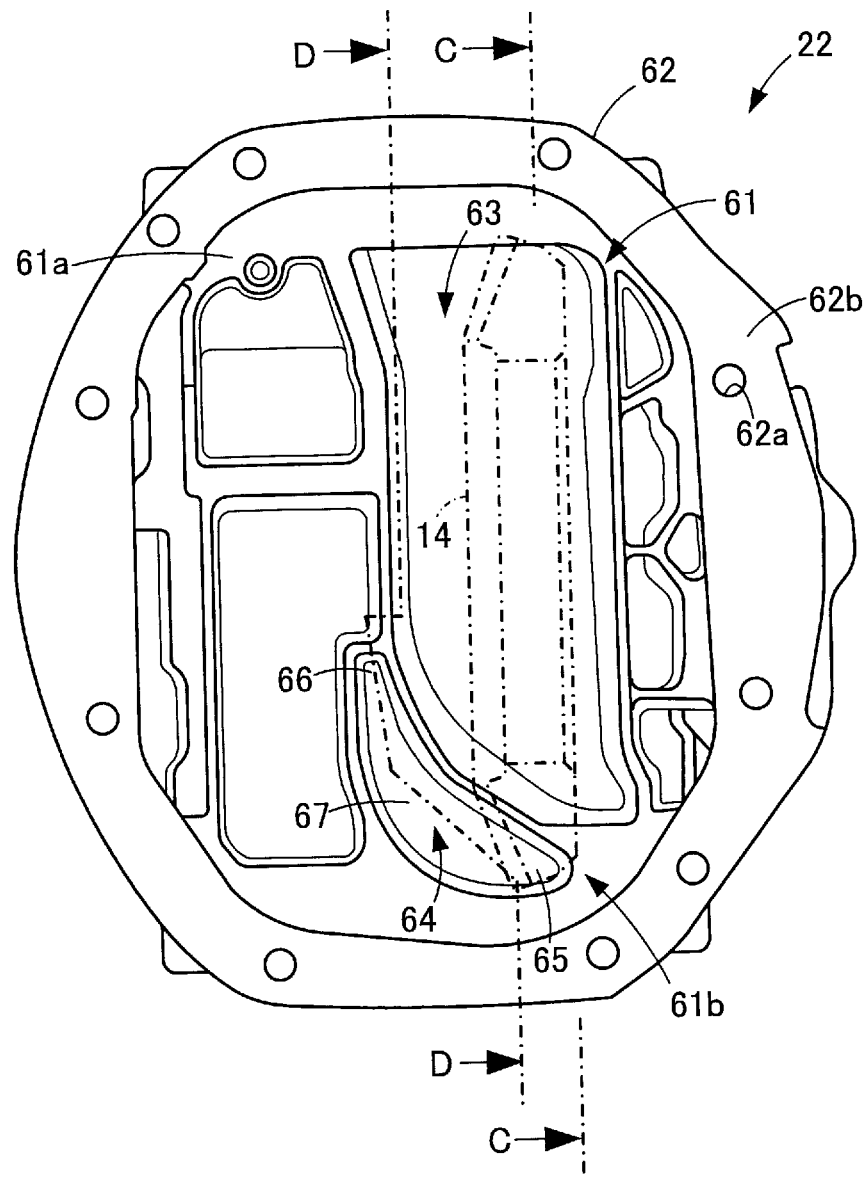
FIG. 7 is a front view showing the carrier cover of the differential apparatus according to the embodiment of the present invention.
Figure 8:
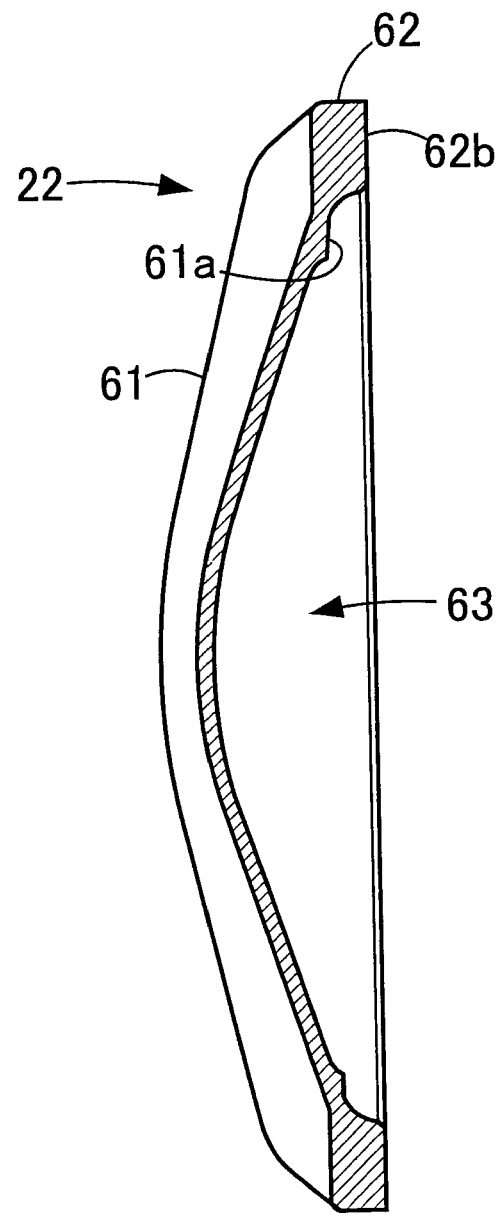
FIG. 8 is a cross-sectional view taken along the line C-C of FIG. 7.

The carrier cover 22 has a cover portion 61 and a flange portion 62 as shown in FIGS. 6 and 7. The cover portion 61 has a ring gear receiving portion 63 and a lubricant oil flow guide portion 64. The ring gear receiving portion 63 is in the form of an arcuate groove and formed on an inner wall surface 61a of the carrier cover 22 so that the ring gear receiving portion 63 serves to receive a side portion of the ring gear 14. The lubricant oil flow guide portion 64 has a flow guide groove formed on the lower portion 61b of the inner wall surface 61a of the carrier cover 22 to vertically extend in the vicinity of and in side-by-side relationship with the lower portion 63a of the ring gear receiving portion 63, viz., the outer circumferential portion 14a of the ring gear 14 and to be open toward the outer circumferential portion 14a of the ring gear 14. The flow guide groove has a lower end portion soaked in the lubricant oil of the reservoir chamber, and an upper end portion positioned in the vicinity of the central portion of the differential case 11.

The lubricant oil flow guide portion 64 has a lubricant oil inlet port 65 to have the lubricant oil introduced therethrough from the lubricant oil reservoir portion when the lubricant oil is supplied from the lubricant oil reservoir portion 28 formed at the lower portion 21g of the differential carrier 21. The lubricant oil flow guide portion 64 further has a lubricant oil outlet port 66 to have the lubricant oil discharged toward the central portion of the differential mechanism 12 therethrough, and a lubricant oil passageway 67 formed to extend between the lubricant oil inlet port 65 and the lubricant oil outlet port 66 to have the lubricant oil inlet port 65 held in communication with the lubricant oil outlet port 66 so that the lubricant oil can be allowed to pass from the lubricant oil inlet port 65 to the lubricant oil outlet port 66 through the lubricant oil passageway 67.

The lubricant oil inlet port 65 is positioned in the vicinity of the lower part of the ring gear 14 so that the lubricant oil stirred up with the rotation of the ring gear 14 can easily be introduced into the lubricant oil passageway 67 through the lubricant oil inlet port 65. The lubricant oil outlet port 66 is positioned in the vicinity of the central portion of the ring gear 14 so that the lubricant oil is discharged though the lubricant oil outlet port 66 toward the central portion of the differential mechanism 12.

The lubricant oil flow guide portion 64 is therefore adapted to have the lubricant oil introduced into the lubricant oil passageway 67 through the lubricant oil inlet port 65, then guided by the lubricant oil passageway 67, and then discharged through the lubricant oil outlet port 66 toward the central portion of the differential mechanism 12.

Figure 9:
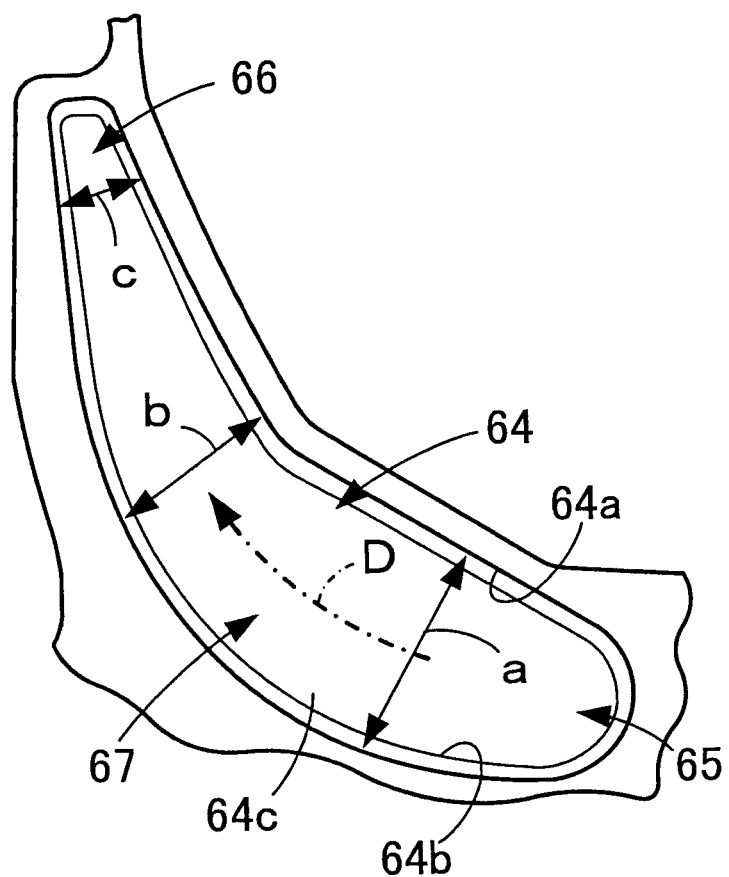
FIG. 9 is an enlarged fragmentary front view showing a lubricant oil flow guide portion formed in the carrier cover of the differential apparatus according to the embodiment of the present invention.

As best shown in FIG. 9, the lubricant oil passageway 67 of the lubricant oil flow guide portion 64 is formed by an inner wall surface 64a, i.e., a division wall for dividing the ring gear receiving portion 63 and the lubricant oil flow guide portion 64, an inner wall surface 64b in face-to-face and spaced relationship with the inner wall surface 64a, and a bottom surface 64c connecting the inner wall surfaces 64a and 64b.

The lubricant oil passageway 67 is shown in FIG. 9 to have a width represented by the legend "a" near the lubricant oil inlet port 65, a width represented by the legend "b" at the intermediate position of the lubricant oil passageway 67, and a width represented by the legend "c" near the lubricant oil outlet port 66. Therefore, these widths have a relationship of "a">"b">"c", which means that the width of the lubricant oil passageway 67 becomes gradually decreased, viz., becomes small as the lubricant oil passageway 67 becomes closer to the lubricant oil outlet port 66 than the lubricant oil inlet port 65. The lubricant oil passageway 67 is tapered from the lubricant oil inlet port 65 to the lubricant oil outlet port 66 so that the lubricant oil introduced into the lubricant oil passageway 67 through the lubricant oil inlet port 65 is therefore accelerated in flow speeds in the lubricant oil passageway 67 toward the lubricant oil outlet port 66, and intensively discharged through the lubricant oil outlet port 66 toward the central portion of the differential mechanism 12.

Figure 10:
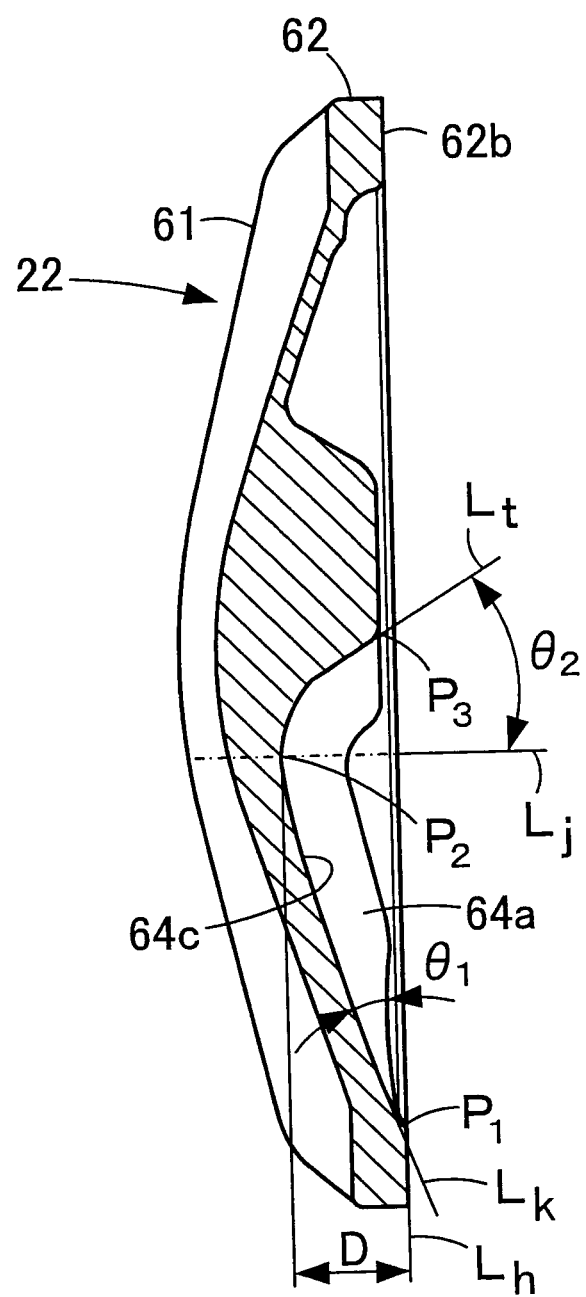
FIG. 10 is a cross-sectional view taken along the line D-D of FIG. 7.

As shown in FIG. 10, the bottom surface 64c of the lubricant oil passageway 67 is inclined with its depth "D" from the inlet point P1 of the lubricant oil inlet port 65 to the bottom point P2 of the lubricant oil passageway 67 at an inclination angle "theta 1" between a line Lh and a line Lk. In addition, the bottom surface 64c is inclined at an inclination angle "theta 2" between a line Lj and a line Lt from the bottom point P2 to the outlet point P3 of the lubricant oil outlet port 66 so that the lubricant oil introduced into the lubricant oil passageway 67 through the lubricant oil inlet port 65 can be intensively discharged through the lubricant oil outlet port 66 along the bottom surface 64c inclined at the angle of "theta 2" toward the central portion of the differential mechanism 12.

The flange portion 62 has a plurality of through bores 62a formed therein to be circumferentially spaced apart from each other and a flat engagement surface 62b to be engaged with the differential carrier 21. Each of the through bores 62a has a bolt passed therethrough to secure the carrier cover 22 to the differential carrier 21. The carrier cover 22 is firmly attached to the differential carrier 21 through the engagement surface 62b when the bolts are tightened.

As shown in FIG. 2, the lubricant oil reservoir portion 28 has an inner side wall 21f formed by the lower part of the differential carrier 21, and is formed with a reservoir chamber 28a defined by the inner side wall 21f and the inner wall surface 61a of the carrier cover 22. The inner wall surface 61a is formed by the lower part of the carrier cover 22. The reservoir chamber 28a is held in communication with the lubricant oil inlet port 65, the lubricant oil outlet port 66, and the lubricant oil passageway 67. It will therefore be understood that the lubricant oil inlet port 65, the lubricant oil outlet port 66, and the lubricant oil passageway 67 of the lubricant oil flow guide portion 64 collectively constitute a lubricant oil flow guide portion defined in the present invention.

The angles "theta 1" and "theta 2", the depth "D", the relative positions of the inlet point P1, the bottom point P2, and the outlet point P3 of the lubricant oil flow guide portion 64 are appropriately selected in accordance with the specification of the automotive vehicle 1, the construction, the configuration and the size of the differential apparatus 6, the revolution (rpm) of the ring gear 14, and lubrication characteristics specified by the viscosity of the lubricant oil (Pa*s), and other factors.

Figure 11:
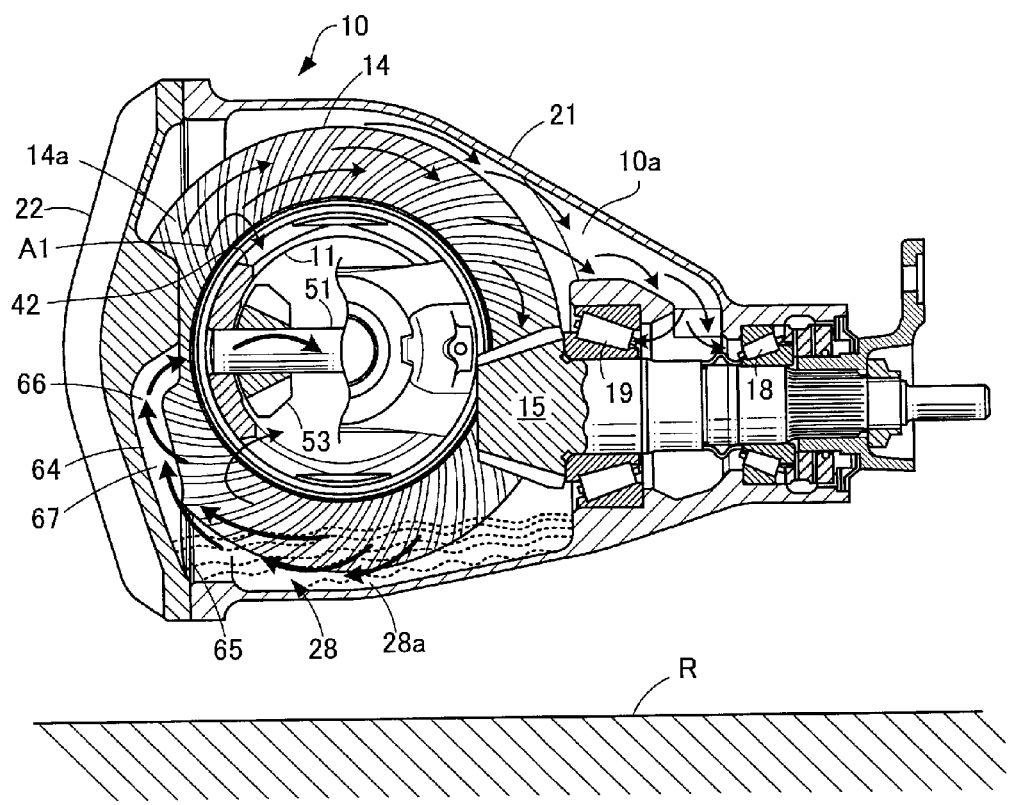
FIG. 11 is a cross-sectional view taken along the line A-A of FIG. 1, and showing a flow condition of the lubricant oil in the differential apparatus.
Figure 12:
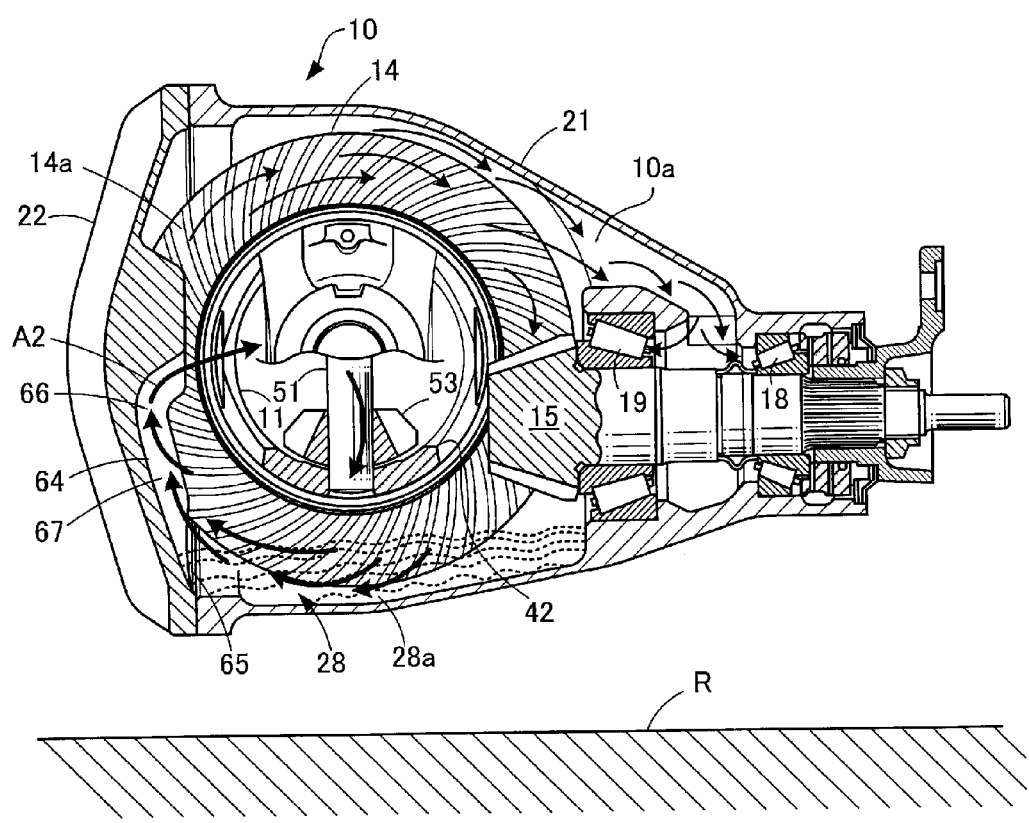
FIG. 12 is a cross-sectional view similar to FIG. 11 but showing the state in which the differential case 11 is rotated by an angle of 90 degrees from the state in FIG. 11.
Figure 13:
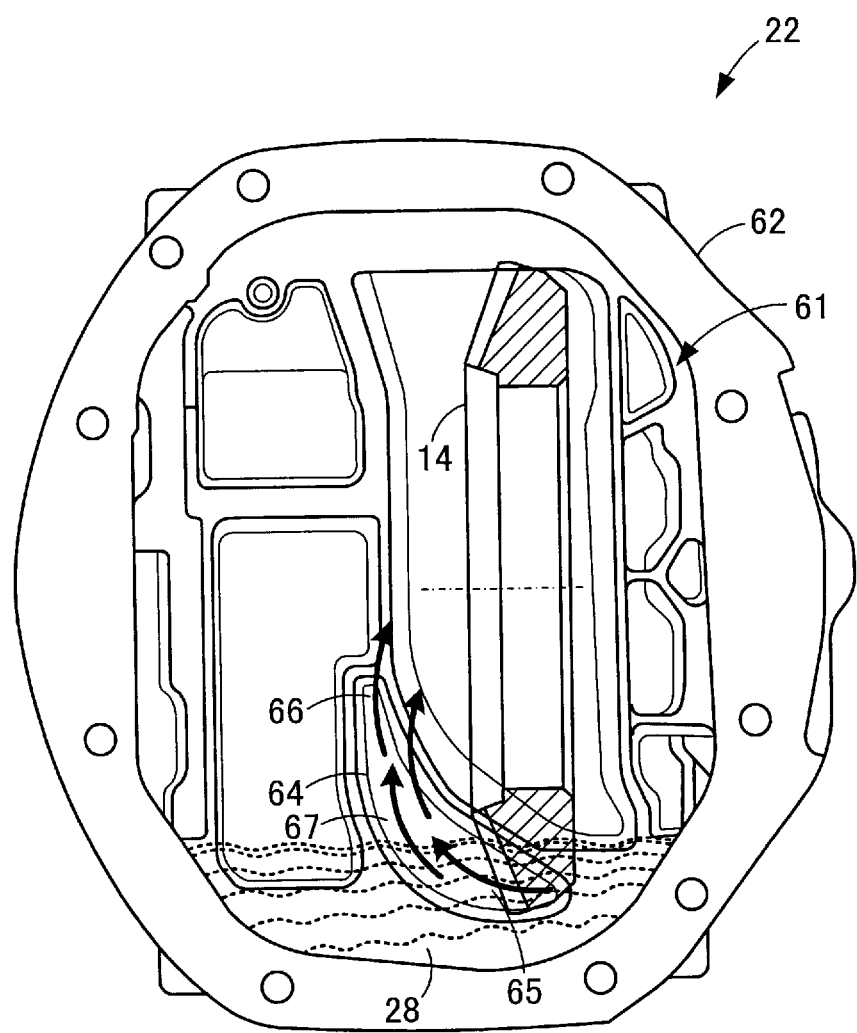
FIG. 13 is a front view showing the carrier cover of the differential apparatus according to the embodiment of the present invention, and showing a flow condition of the lubricant oil in the differential apparatus.

The operation of the differential apparatus 6 according to the embodiment of the present invention will now be described hereinafter. When the engine 2 shown in FIG. 1 starts, the power outputted from the engine 2 is transmitted to the drive pinion 15 shown in FIG. 2 through the transmission 3 and the propeller shaft 5. The rotation of the drive pinion 15 makes the ring gear 14 rotated, which results in the fact that the lubricant oil reserved in the lubricant oil reservoir portion 28 is stirred up by the ring gear 14 as shown by arrows in FIGS. 11 to 13.

In this case, the lubricant oil stirred up by the ring gear 14 is introduced through the lubricant oil inlet port 65, then forming an oil flow accelerated in flow speed in the lubricant oil passageway 67, and then intensively discharged through the lubricant oil outlet port 66 toward the central portion of the differential mechanism 12 through the through bore 42 held in communication between the inner and outer spaces of the differential case 11. The lubricant oil discharged through the outlet port 66 is supplied to the central portion of the differential mechanism 12 through the through bores 42 of the differential case 11 as shown by an arrow A1 in FIG. 11 and an arrow A2 in FIG. 12. The lubricant oil is then adhered around the rotation center of the pinion shaft 51. The lubricant oil adhered to the pinion shaft 51 then reaches the differential pinions 53 and 54 under the influence of the centrifugal force caused by the rotation of the pinion shaft 51. The lubricant oil is then sent to the left side gear 55 and the right side gear 56 both of which are meshed with the differential pinions 53 and 54, and other sliding contact portions of lubrication elements, thereby resulting in the lubrication elements being lubricated.

The sliding contact portions between the pinion shaft 51 and the differential pinions 53 and 54 are supplied with a sufficient amount of lubricant oil, thereby resulting in preventing the seizure on the sliding contact portions between the pinion shaft 51 and the differential pinions 53 and 54 and between other elements or parts even when the engine 2 is operated in a high speed state. This is due to the fact that the lubricant oil is sufficiently stirred up by the ring gear 14 and supplied to the sliding contact portions resulting from the high speed rotation of the ring gear 14.

The lubricant oil discharged through the lubrication oil outlet port 66 is partly supplied to the conical roller bearings 18 and 19 through a space formed between the upper portion of the ring gear 14 and the inner side surface of the differential carrier 21.

The rotation of the ring gear 14 makes the differential case 11 shown in FIG. 3 also rotated. In this situation, the pinion shaft 51 rotates together with the differential case 11, and the differential pinions 53 and 54 rotate around the center axis of the differential case 11. The left side gear 55 and the right side gear 56 held in mesh with the differential pinions 53 and 54 are therefore rotated together with each other. This results in the left rear wheel 9L being rotated with the rotation of the left rear drive shaft 7L, while the right rear wheel 9R being rotated with the rotation of the right rear drive shaft 7R.

When the automotive vehicle 1 is turning, for example, to the right direction, the left rear wheel 9L rotates faster than the right rear wheel 9R, which causes the difference in rotation speed between the left rear wheel 9L and the right rear wheel 9R. Under this condition, the rotations of the differential pinions 53 and 54, the differential case 11 allow the difference in rotation speed between the left rear wheel 9L and the right rear wheel 9R. This means that the left and right rear wheels 9L and 9R can rotate at the rotation speeds different from each other.

The differential apparatus 6 according to this embodiment which has been explained in the above can obtain various advantages as described hereinafter resulting from the aforementioned construction.

As will be understood from the foregoing description, the differential apparatus 6 comprises the differential case 11 for accommodating the differential mechanism 12, the differential carrier 21 and the carrier cover 22 for accommodating therein the differential case 11, and the ring gear 14 secured to the differential case 11 to rotate together with the differential case 11.

The differential case 11 is formed with the through bores 42 extending to have the interior and exterior of the differential case 11 held in communication with each other, while the differential carrier 21 and the carrier cover 22 have the lubricant oil reservoir portion 28 to reserve the lubrication oil, and the differential carrier 21 has the lubricant oil flow guide portion 64 for discharging the lubricant oil stirred up by the rotation of the ring gear 14 toward the central portion of the differential mechanism 12 through the through bores 42.

The lubricant oil flow guide portion 64 has the lubricant oil inlet port 65 to have the lubricant oil introduced therethrough, the lubricant oil outlet port 66 to discharge the lubricant oil toward the central portion of the differential mechanism 12, and the lubricant oil passageway 67 formed to extend between the lubricant oil inlet port 65 and the lubricant oil outlet port 66. The lubricant oil passageway 67 has a width perpendicular to the flow direction of the lubricant oil flowing from the lubricant oil inlet port 65 to the lubricant oil outlet port 66. The lubricant oil passageway 67 is formed in such a manner that the width of the lubricant oil passageway 67 becomes gradually decreased from the lubricant oil inlet port 65 to the lubricant oil outlet port 66, viz., becomes small as the positions on the lubricant oil passageway 67 become closer to the lubricant oil outlet port 66 than the lubricant oil inlet port 65. In other words, the closer to the lubricant oil outlet port 66 the positions on the lubricant oil passageway 67 become, the smaller becomes the width of the lubricant oil passageway 67. In this way, the lubricant oil passageway 67 is tapered in width toward the lubricant oil passageway 67.

This results in the fact that the differential apparatus 6 can easily have relatively a large amount of lubrication oil introduced into the lubrication oil inlet port 65 when the lubricant oil is stirred up by the ring gear 14, due to the fact that the lubricant oil inlet port 65 is formed at the position close to the lubricant oil reservoir portion 28. It will therefore be understood that the lubricant oil in the lubricant oil reservoir portion 28 can easily and sufficiently be introduced to the lubricant oil inlet port 65.

The lubricant oil passageway 67 is tapered in such a manner that the width of the lubricant oil passageway 67 gradually becomes small as the positions on the lubricant oil passageway 67 become closer to the lubricant oil outlet port 66 than the lubricant oil inlet port 65. The lubricant oil introduced through the lubricant oil inlet port 65 is therefore accelerated in flow speeds in the lubricant oil passageway 67 toward the lubricant oil outlet port 66. The lubricant oil passageway 67 is also formed in such a manner that the bottom surface 64c around the lubricant oil outlet port 66 is inclined toward the central portion of the differential mechanism 12.

The tapered and inclined lubricant oil passageway 67 thus constructed makes it possible for the lubrication oil to be intensively discharged through the lubricant oil outlet port 66 toward the central portion of the differential mechanism 12. The lubricant oil intensively discharged through the outlet port 66 toward the central portion of the differential mechanism 12 is then passed through the through bores 42 of the differential case 11 to sufficiently lubricate the pinion shaft 51, the differential pinions 53 and 54, and the left side gear 55 and the right side gear 56, and other lubrication elements without causing any seizure thereon. Therefore, the differential apparatus 6 according to the embodiment of this invention can reliably have the enhanced characteristics of the differential movement by allowing the left and right wheels 9L and 9R to smoothly rotate at different rotation speeds from each other.

Figure 14:
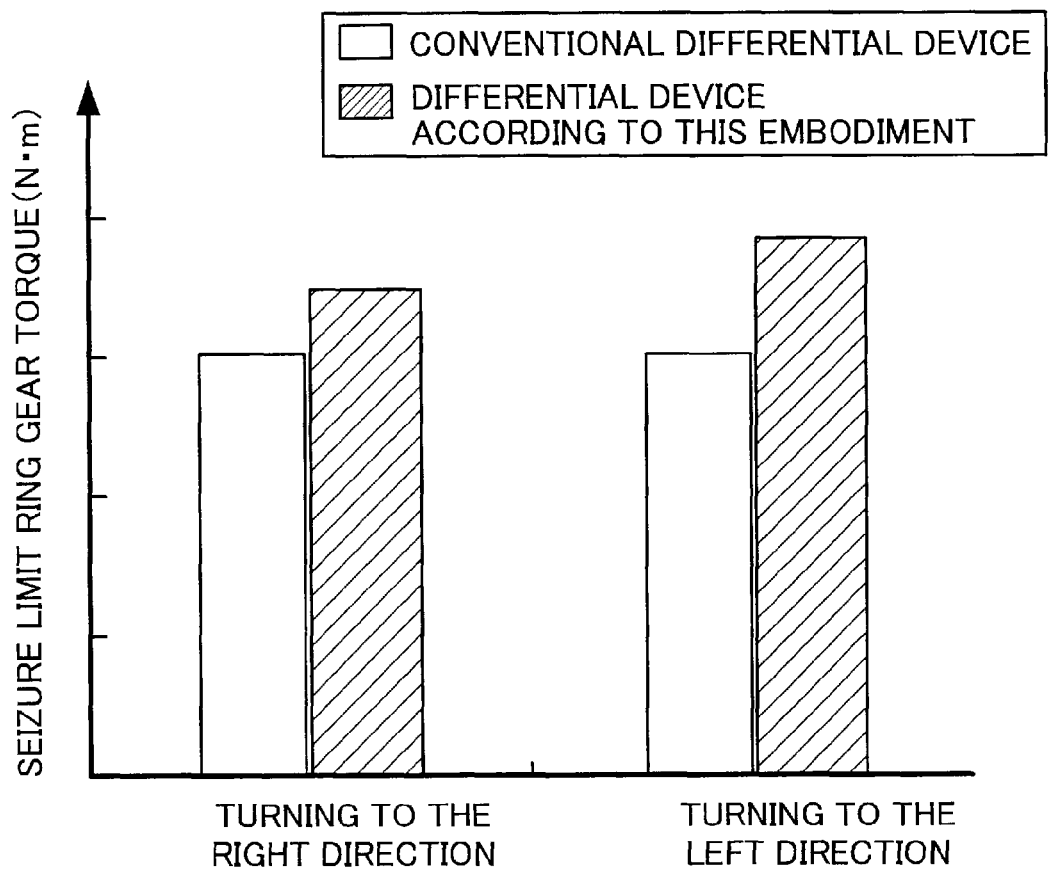
FIG. 14 is a graph showing limit torques applied to a ring gear without causing any seizure according to the embodiment of the present invention.

The differential apparatus 6 according to the embodiment of this invention can have excellent lubrication characteristics as compared with the conventional differential apparatus irrespectively of the automotive vehicle 1 turning to the left direction or to the right direction as shown in FIG. 14. FIG. 14 is a graph showing seizure limit ring gear torques (N*m) of the ring gears used in the differential apparatus 6 according to the embodiment of this invention and the conventional differential apparatus. The shown seizure limit ring gear torques respectively indicating maximum limit torques (N*m) applied to the ring gears assembled in the both apparatuses immediately before causing seizure between the pinion shaft 51 and the differential pinions 53 and 54. The shown graph is raised for comparison of the differential apparatus according to the embodiment of this invention with the conventional differential apparatus to indicate that the differential apparatus according to the embodiment of this invention is more excellent in term of the seizure difficult in occurring than the conventional differential apparatus.

The seizure limit ring gear torque (N*m) can be evaluated in, for example, a following evaluation equipment and method. The evaluation equipment and method will be described hereinafter.

The evaluation equipment comprises, though not shown, a drive motor, a propeller shaft, a right drive shaft, a left drive shaft, a right side motor, a left side motor, and a plurality of torque meters for detecting output torques thereof. The evaluation equipment is constructed in such a manner that the propeller shaft is connected to the differential apparatus to be evaluated, the drive motor is connected to the propeller shaft as a drive source, and the torque meter is provided between the propeller shaft and the drive motor to detect the output torque applied to the propeller shaft. Additionally, the evaluation equipment is constructed in such a manner that the right drive shaft is connected to the differential apparatus, the right side motor is connected with the right drive shaft to apply a right side torque to the right drive shaft, and a right side torque meter is arranged between the right drive shaft and the right side motor to detect a torque applied to the right drive shaft. Furthermore, the evaluation equipment is constructed in such a manner that the left drive shaft is connected to the differential apparatus, the left side motor is connected to the left drive shaft, and a left side torque meter is arranged between the left drive shaft and the left side motor to detect a left side torque applied to the left drive shaft.

This construction makes it possible to apply the output torque to the differential apparatus to be evaluated from the drive motor through the propeller shaft. At the time when the output torque is applied to the propeller shaft, the right side torque is applied to the right drive shaft while the left side torque is applied to the light drive shaft. This means that the right drive shaft and the left drive shaft are rotated at different rotation speeds. These torques are detected by the respective torque meters, and information of the detected torques is sent to a control apparatus forming part of the evaluation equipment as feedback information. The control apparatus is operative to control the ring gear of the differential apparatus to be rotated at a predetermined rotation speed, and to control the right side motor and the left side motor to have the right drive shaft and the left drive shaft rotated at different rotation speeds.

The following evaluation method will be performed with the evaluation equipment. Firstly, the differential apparatus to be evaluated is set to the evaluation equipment, and the ring gear is rotated at a predetermined rotation speed while the right drive shaft and the left drive shaft are rotated at different rotation speeds by the control apparatus. At this time, a predetermined torque is applied to the ring gear of the differential apparatus. The rotation speed of the ring gear and the different rotation speeds between the right drive shaft and the left drive shaft are set in accordance with a variety of factors, such as for example, the construction, the configuration, the size of the differential apparatus to be evaluated, and a magnitude of torque transmitted to the differential apparatus, and in accordance with the experimental values and data obtained through the simulation of the differential apparatus.

Then, it is judged whether the difference between torques detected by the right side torque meter and the left side torque meter is larger or not larger than the difference between torques applied to the right drive shaft and left drive shaft. It is also judged whether abnormal noises are generated or not generated from the differential apparatus. It is further judged whether a waveform indicative of the output power information with regard to the powers outputted to the right side motor and the left side motor contains or does not contain an abnormal shape.

If it is judged that there is not any change or abnormality found through the above judgments, the control apparatus is operated to increase by a predetermined magnitude the torque applied to the ring gear of the differential apparatus. If the change or abnormality is found through at least one of the above judgments, the operation of the evaluation equipment is stopped, and the differential apparatus to be evaluated is then disassembled so as to judge whether seizure or abrasion occurs or does not occur to the differential mechanism, such as for example, the elements or parts exemplified by the pinion shaft, the pair of differential pinions, and the left and right side gears.

In the case that the seizure or abrasion has occurred to the constituent elements or parts previously mentioned, the magnitude of torque applied to the ring gear of the differential apparatus is recorded. This recorded torque is determined and memorized as the seizure limit ring gear torque. Meanwhile, in the case that seizure and abrasion have not occurred, the disassembled differential apparatus is reassembled and set to the evaluation equipment. The differential apparatus is then controlled by the control apparatus to judge again whether there is not any change or abnormality in a similar manner to the previous step. In the case that seizure or abrasion has again occurred to the constituent elements or parts previously mentioned, the magnitude of torque applied to the ring gear of the differential apparatus is again recorded. This recorded torque is again determined and memorized as the seizure limit ring gear torque.

It will therefore be understood that the evaluation method makes it possible to check whether the seizure occurs or does not occur through the use of the aforementioned evaluation equipment.

As will be understood from the foregoing description made with reference to FIG. 14, the seizure limit ring gear torque (N*m) of the differential apparatus 6 according to the present embodiment is increased as compared with the conventional differential apparatus since the sliding contact portions between the pinion shaft 51 and the differential pinions 53 and 54 can be sufficiently lubricated.

The differential apparatus 6 according to the present embodiment is simple in construction and advantageous in improving the lubrication performance without increasing the size and the weight of the overall differential apparatus; by merely arranging and forming the lubricant oil flow guide portion 64 in the carrier cover 22 in accordance with the invention.

There has been explained in the foregoing description about the case that the differential apparatus 6 according to the present embodiment is applied to a rear differential apparatus mounted on the automotive vehicle 1 to drive the rear left and right wheels.

However, the differential apparatus according to the embodiment of the present invention may be applied to any types of differential apparatus. For example, the differential apparatus may be applied to a center differential apparatus mounted on a fourwheel-drive automotive vehicle, or may be applied to a differential apparatus forming part of a transaxle.

There has so far been described about the case that the lubricant oil passageway 67 has a width of "a" near the lubricant oil inlet port 65, a width of "b" at the intermediate position of the lubricant oil passageway 67, and a width of "c" near the lubricant oil outlet port 66 as shown in FIG. 9. That is, these widths have a relationship of "a">"b">"c" so that the width becomes small as the positions of the lubricant oil passageway 67 is closer to the lubricant oil outlet port 66 than the lubricant oil inlet port 65.

However, the differential apparatus according to the invention may have a lubricant oil flow guide portion formed with the widths of the lubricant oil passageway 67 having a relationship other than "a">"b">"c". For example, these widths of the lubricant oil passageway 67 may have a relationship of "a"="b">"c", or may have a relationship of "a"="b"="c".

There has so far been described about the fact that the differential apparatus 6 according to this embodiment has the lubricant oil passageway 67 of the lubricant oil flow guide portion 64 formed by an inner wall surface 64a, i.e., a division wall for dividing the ring gear receiving portion 63 and the lubricant oil flow guide portion 64, an inner wall surface 64b in face-to-face and spaced relationship with the inner wall surface 64a, and a bottom surface 64c formed to extend between the inner wall surfaces 64a and 64b as shown in FIG. 9. In other words, the lubricant oil passageway 67 of the lubricant oil flow guide portion 64 has been explained as integrally formed in the carrier cover 21.

However, the lubricant oil flow guide portion 64 may be formed with any construction other than the previously mentioned construction formed in the carrier cover. For example, the lubricant oil flow guide portion may be formed in a lubrication oil flow guide member to be provided in the differential apparatus independently of and thus separated from the carrier cover 22. In this case, the lubrication oil flow guide member is to be firmly fastened to the inner wall surface of the carrier cover 22 arranged in face-to-face relationship with the differential carrier 21.

In accordance with the present invention, there is provided a differential apparatus 6 which is simple in construction and can reliably guide a lubricant oil stirred up by the rotation of the ring gear, supply the lubricant oil to the lubrication elements accommodated in the differential apparatus, and sufficiently lubricate the lubrication elements, and thus is useful as a differential apparatus in which the lubricant oil is reserved at its inner portion and stirred up by the ring gear.

The invention claimed is:
1. A differential apparatus, comprising:
a differential case for accommodating therein a differential mechanism having a central portion,
a housing for accommodating therein and rotatably supporting the differential case,
a ring gear secured to the differential case to be rotatable together with the differential case and having an outer circumferential portion, and
a drive pinion held in mesh with the ring gear, wherein
the differential case has inner and outer spaces and is formed with at least one through bore radially extending between the inner and outer spaces to have the inner and outer spaces held in communication with each other,
the housing has a lubricant oil reservoir portion positioned below the differential case to reserve lubricant oil therein, and a lubricant oil flow guide portion extending in the vicinity of and in side-by-side relationship with the outer circumferential portion of the ring gear,
the lubricant oil flow guide portion has a lower lubricant oil inlet port soaked in the lubricant oil of the lubricant oil reservoir portion, an upper lubricant oil outlet port positioned in the vicinity of the central portion of the differential mechanism, and a lubricant oil passageway extended from the lower lubricant oil inlet port to the upper lubricant oil outlet port to pass the lubricant oil therethrough from the lower lubricant oil inlet port to the upper lubricant oil outlet port,
the lower lubricant oil inlet port is positioned in the vicinity of a lower part of the ring gear,
the lubricant oil inlet port is provided on the same plane as the plane of rotation of the ring gear,
the lubricant oil discharge port is provided on a plane different from the plane of rotation of the ring gear,
the lubricant oil passageway is curved to guide the lubricant oil from the lubricant oil inlet port to the lubricant oil outlet port and has a width perpendicular to the flow direction of the lubricant oil flowing from the lubricant oil inlet port to the lubricant oil outlet port, the width being gradually decreased from the lubricant oil inlet port to the lubricant oil outlet port, and
the lubricant oil flow guide portion is positioned at an opposite side of the drive pinion with respect to the differential mechanism to guide the lubricant oil stirred up from the lubricant oil reservoir portion with the rotation of the ring gear to ensure that the lubricant oil is discharged toward the central portion of the differential mechanism through the through bore.

2. The differential apparatus as set forth in claim 1, wherein the housing is constituted by a differential carrier accommodating therein and rotatably supporting the differential case, and a carrier cover secured to the differential carrier forming together with the differential carrier a housing chamber accommodating therein the differential case and the ring gear, the lubricant oil reservoir portion has a reservoir chamber formed to occupy the lower portion of the housing chamber by the lower portions of the differential carrier and the carrier cover to reserve the lubricant oil therein, the lubricant oil flow guide portion having a flow guide groove formed in the inner wall of the carrier cover to extend in the vicinity of and in side-by-side relationship with the outer circumferential portion of the ring gear and to be open toward the central portion of the differential mechanism, the flow guide groove having the lower lubricant oil inlet port soaked in the lubricant oil of the reservoir chamber, and the upper lubricant oil outlet port positioned in the vicinity of the central portion of the differential mechanism.

3. The differential apparatus as set forth in claim 1, wherein the lubricant oil flow guide portion has the lubricant oil inlet port positioned in a reservoir chamber to have the lubricant oil introduced therethrough from the lubricant oil reservoir portion, the lubricant oil outlet port open toward the central portion of the differential mechanism to have the lubricant oil discharged toward the central portion of the differential mechanism, and the lubricant oil passageway extending between the lubricant oil inlet port and the lubricant oil outlet port to have the lubricant oil inlet port held in communication with the lubricant oil outlet port.

* * * * *